United States Patent [19]

Fränkle et al.

[11] 4,231,346
[45] Nov. 4, 1980

[54] CONTROL ARRANGEMENT FOR A SUPERCHARGED DIESEL ENGINE

[75] Inventors: Gerhard Fränkle, Remshalden-Grunbach; Dieter Woschée, Esslingen, both of Fed. Rep. of Germany

[73] Assignee: Daimler-Benz Aktiengesellschaft, Fed. Rep. of Germany

[21] Appl. No.: 865,873

[22] Filed: Dec. 30, 1977

[30] Foreign Application Priority Data

Dec. 30, 1976 [DE] Fed. Rep. of Germany ...... 2659498

[51] Int. Cl.³ .............................................. F02D 1/04
[52] U.S. Cl. .................................... 123/457; 123/463
[58] Field of Search ................. 123/140 MP, 140 CC, 123/104

[56] References Cited

U.S. PATENT DOCUMENTS

| | | | |
|---|---|---|---|
| 3,766,899 | 10/1973 | Isselhorst | 123/140 CC |
| 3,970,065 | 7/1976 | Kaibara et al. | 123/140 CC |
| 4,054,112 | 10/1977 | Kurokawa et al. | 123/140 MP |
| 4,064,856 | 12/1977 | Augustin | 123/140 CC |

FOREIGN PATENT DOCUMENTS 2251088  5/1974  Fed. Rep. of Germany .... 123/140 CC

*Primary Examiner*—Charles J. Myhre
*Assistant Examiner*—Craig R. Feinberg
*Attorney, Agent, or Firm*—Craig & Antonelli

[57] ABSTRACT

A control arrangement for a supercharged diesel engine, which is equipped with an injection pump and with a governor at the injection pump, as well as with a full-load abutment movable as a function of the engine rotational speed for the limitation or release of the injection quantity. The full-load abutment is thereby constructed as three-dimensional cam which is dependent in the direction of its second dimension on a magnitude changing analogously to the supercharging degree or on the supercharging pressure.

4 Claims, 2 Drawing Figures

CONTROL ARRANGEMENT FOR A SUPERCHARGED DIESEL ENGINE

The present invention relates to a control arrangement for a supercharged diesel engine, with an injection pump and with a rotational speed governor at the injection pump, as well as with a full load abutment movable in dependence of the engine speed for the limitation or the release of the injection quantity.

A control arrangement for the limitation of the smoke exhaust for supercharged diesel engines is known in the art, which consists of a diaphragm acted upon by the supercharging pressure, which releases a predetermined injection quantity in dependence on the magnitude of the respective supercharging pressure. Within the non-steady operating range of the supercharging engine, however, the design of the full-load abutment dependent on the supercharging pressure which is made according to full load requirements has as a consequence a delayed quantity release since, for that purpose, the supercharging pressure has to build up at first (negative matching). The acceleration behavior of the diesel engine with the known full-load abutment control arrangement which is dependent on the supercharging pressure is therefore worse than it could be with a predetermined permissive smoke emission.

It is the aim of the present invention to match the control of the injection quantity behavior to the diesel engine in the non-steady operating range.

The underlying problems are solved according to the present invention in that the full-load abutment is constructed as three-dimensional cam which in the direction of its second dimension is dependent on a magnitude changing analogously to the supercharging degree, especially on the air mass or the supercharging pressure.

As a result thereof, it is possible to release the permitted injection quantity for a predetermined smoke emission or discharge in dependence on the instantaneous air condition (mass of air in the engine) and of the respective engine rotational speed. The corresponding values of the three-dimensional cam can be picked up or detected by a follower or pick-up pin connected with the control rack of the injection pump, from which the maximum control path for the control rack is released.

The construction of the three-dimensional cam is such that a displacement in the axial direction is proportional to the rotational speed, and a rotation thereof is proportional to the air mass flowing through the engine.

Of course, the rotation of the cam may also be carried out by a rotational speed signal, and the displacement by the air mass signal. By reason of the direct interrelationship of supercharging pressure and flowing air mass, also the supercharging pressure can be used as air mass signal for a fixed rotational speed so that the full load abutment which heretofore was dependent on the supercharging pressure can take over one of the two positioning tasks.

In order to obtain the coordination between the supercharging pressure and the injection quantity possible with a predetermined smoke discharge, starting, from a stationary operating point, the injection quantity is increased for such length of time with simultaneous bleeding ahead of the turbine (the supercharging pressure and the temperatures thereby remain constant) until the predetermined smoke limit value is reached. The thus-resulting coordination between the instantaneously available supercharging pressure and the injection quantity permissive for a predetermined smoke discharge produces the three-dimensional cam geometry. If the three-dimensional cam is determined as described, then the advantage results therefrom that the full load can be driven during the acceleration with an excess quantity of fuel in those operating ranges in which the engine demonstrates a favorable smoke behavior. However, it should be noted in connection therewith that other magnitudes such as, for example, the peak pressure, the maximum permissive torque, etc., are not increased above the degree permissive for a given engine.

The best possible acceleration behavior of a diesel engine can be obtained with the control in accordance with the present invention with a predetermined maximum smoke emission.

Furthermore, the rotational speed signal can be introduced by way of the measuring unit of the injection pump controller rotational speed governor; the controller or rotational speed governor, however, may also include a non-mechanical rotational speed transmitter.

Accordingly, it is an object of the present invention to provide a control arrangement for a supercharged diesel engine which avoids by simple means the aforementioned shortcomings and drawbacks encountered in the prior art.

Another object of the present invention resides in a control arrangement for a supercharged diesel engine which assures an optimum acceleration behavior of the diesel engine without violating the smoke emission regulations.

A further object of the present invention resides in a control arrangement for a supercharged diesel engine in which the control of the injection quantity can be readily matched to the diesel engine in the non-steady operating range.

A still further object of the present invention resides in a control arrangement for a supercharged diesel engine in which the maximum permissive injected fuel quantity can be realized under all operating conditions without excessive smoke discharge out of the exhaust system.

These and other objects, features and advantages of the present invention will become more apparent from the following description when taken in connection with the accompanying drawing which shows, for purposes of illustration only, one embodiment in accordance with the present invention and wherein.

Figure 1:
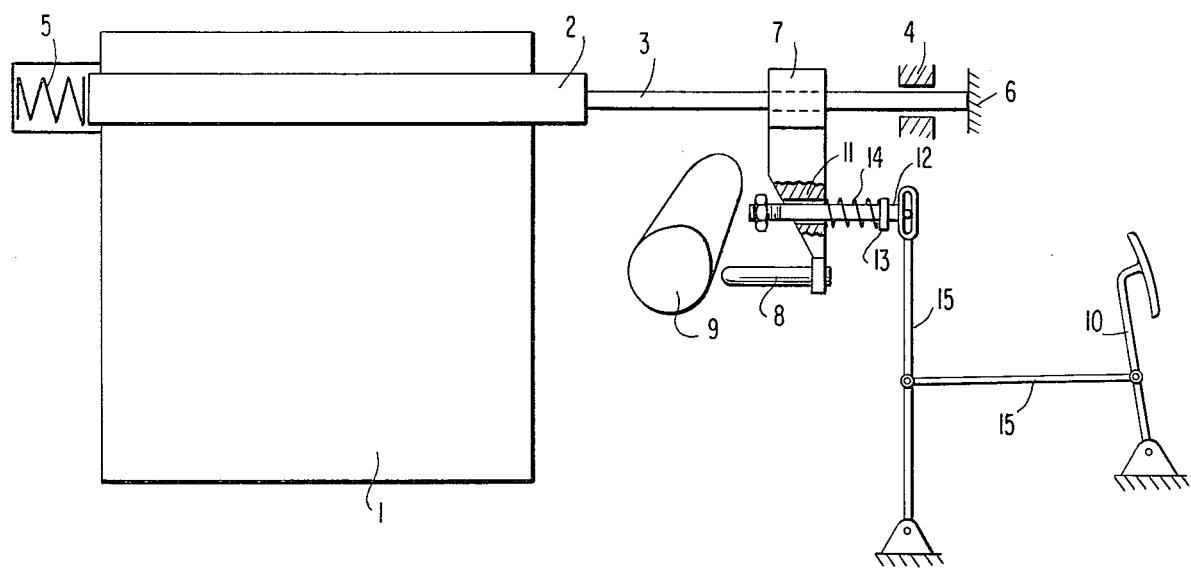
FIG. 1 is a schematic view of a control arrangement for a supercharged diesel engine in accordance with the present invention.
Figure 2:
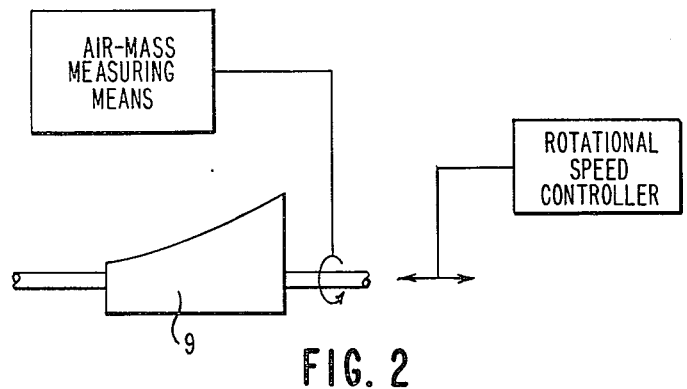
FIG. 2 is a plan view of the three-dimensional cam of FIG. 1.

Referring now to FIG. 1 of the drawing, the control arrangement for a supercharged diesel engine (not shown) consists of an injection pump 1 with a control rack 2 which is guided with its offset end 3 in a guidance 4 and is held against an abutment 6 (zero abutment) by a spring-supported counter abutment 5. The offset end 3 carries a support or mounting member 7 for a follower or pick-up pin 8 which cooperates with a three-dimensional cam 9. As shown in FIG. 2, the three-dimensional cam 9 may be displaced in the axial direction, for example, by a rotational speed signal whereas the rotation of the three-dimensional cam 9 is realized from an air-mass signal. The rotational speed signal can be introduced by way of the measuring unit of the injection pump controller or governor or by way of any other suitable rotational speed transmitter whereas the supercharging pressure is used as air mass signal or the same is derived from an air-mass measuring device which is arranged in the flow paths of the engine. With reference again to FIG. 1 and depending on the position of the three-dimensional cam 9, a predetermined injection quantity is released by the abutment of the follower or pick-up pin 8 on the three-dimensional cam 9. This release position cannot be overcome by pressure on the gas lever or pedal 10 of the internal combustion engine. For this purpose, a guidance 11 is provided in the support or mounting member 7 for a spring-loaded rod 12 adapted to be pressed-through relative thereto, which abuts at the mounting member 7 by means of a spring 14 retained on the rod 12 by a retaining ring 13. The rod 12 is pivotally connected with the gas lever or pedal 10 by way of a linkage 15. If the gas lever or pedal 10 is depressed further than the release which has taken place by way of the three-dimensional cam 9 and the pick-up pin 8, then the rod 12 can be displaced in the guidance 11 relative to the mounting member 7 by overcoming the spring force without the release of a larger injection quantity by the displacement of the control rack 2. The three-dimensional cam geometry results for a predetermined smoke limit value in dependence on the instantaneous rotational speed and the air mass actually present in the engine.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A control arrangement for an internal combustion engine, the control arrangement comprising:
   injection pump means having a slidable control rack;
   full-load abutment means, said abutment means including a three-dimensional cam which is axially displaceable in response to an engine rotational signal provided by a rotational speed controller means and is rotatable in response to an air mass signal provided by an air mass measuring means;
   characterized in that there is a support member fixedly attached to said control rack, a movable gas lever connected to linkage means operably associated with said control rack so as to control the quantity of fuel injected into said engine, cam-engaging means attached to said support member for engaging said three-dimensional cam in a direction corresponding to an increase in said quantity of fuel injected so as to prevent further movement of said control rack, and overload means for forming a yieldable connection between said support member and said linkage means, and in that said overload means permits relative movement between said linkage means and said support member when said cam-engaging means is in engagement with said three-dimensional cam during further movement of said gas lever, thus preventing any further sliding of said control rack.

2. A control arrangement according to claim 1 characterized in that said air mass signal is the supercharging pressure of the engine.

3. A control arrangement according to claim 1, characterized in that a rotational speed signal is supplied by way of the measuring unit of the rotational speed controller means.

4. A control arrangement according to claim 1, characterized in that the rotational speed controller means includes a non-mechanical rotational speed transmitter.

* * * * *